US005497728A

United States Patent [19]
Watanabe

[11] Patent Number: 5,497,728
[45] Date of Patent: Mar. 12, 1996

[54] PET CAGE

[75] Inventor: Kenichi Watanabe, Yokohama, Japan

[73] Assignee: Tokyo Pet Kabushiki Kaisha, Japan

[21] Appl. No.: 266,184

[22] Filed: Jun. 27, 1994

[30] Foreign Application Priority Data

Jul. 5, 1993 [JP] Japan .................................. 5-036608 U

[51] Int. Cl.⁶ ...................................................... A01K 1/03
[52] U.S. Cl. ............................................................ 119/17
[58] Field of Search ................................. 119/17; 446/111

[56] References Cited

U.S. PATENT DOCUMENTS 3,220,773  11/1965  Burns ................................ 446/111 X
4,291,512   9/1981  Walton ............................... 446/111 X

FOREIGN PATENT DOCUMENTS 730458  3/1966  Canada ..................................... 119/17
552377  4/1923  France ..................................... 119/17
829121  6/1938  France ..................................... 119/17

*Primary Examiner*—Robert P. Swiatek
*Attorney, Agent, or Firm*—Poms, Smith, Lande & Rose

[57] ABSTRACT

A pet cage comprises top and side panels made of metal wires to hold a pet within and indoors. At one corner of the top panel, a corner connector is provided to connect the top panel with the two side panels. The corner connector has three engagement grooves in which the metal wire of the connected panels fit. To strengthen the cage further, an edge connector may be provided to connect the two adjacent panels.

6 Claims, 3 Drawing Sheets

PET CAGE

BACKGROUND OF THE INVENTION

The present invention relates to a pet cage, and specifically to a pet cage for containing a dog or cat kept indoors.

A conventional pet cage for containing a small indoor dog is comprised of a box or cage made of synthetic resin. At least right and left side surfaces and the top surface of such a synthetic resin box are covered with respective opaque walls, and an opening for air ventilation is provided to satisfy circulation requirements. It is sometimes difficult to see the pet contained in the synthetic resin cage, thereby decreasing the interaction and giving the pet owner an impression that the pet is confined. Also, the conventional synthetic resin cage has a distinctive silhouette or outline which makes it appear bigger and gives a sense of incompatibility with surrounding furniture when it is placed indoors.

To solve the disadvantages of such a physically obtrusive cage, there is provided a conventional wire pet cage, which is rigid for transporting an animal. On the other hand, it is undesirable to use such a wire cage indoors due to its appearance and structure.

By putting the pet in a box or container indoors, the pet can be protected or isolated from guests. It is a different objective than surrounding the pet by use of a conventional, wire-netting cage for transporting the pet. In either case, it is not suitable to use a conventional pet transportation cage indoors.

In particular, a disadvantage of a conventional pet transportation cage when used indoors is that the corner of any three panels of the box-shaped cage might touch and damage furniture. Clothing can be caught by spaces created by the plurality of surfaces so that the clothing is damaged. Moreover, the three wire surfaces come together at the corners of the wire cage, which form irregularities in the surfaces commonly due to poor assembly, thereby resulting in a cage having an unsatisfactory appearance.

SUMMARY OF THE INVENTION

An object of the present invention is to provide a wire cage suitable to be used indoors that overcomes the foregoing disadvantages.

According to the present invention, there is provided a pet cage comprising at least five panels with one top panel and four side panels, each of which further comprises a metal wire outer frame, and vertical and horizontal metal wires crisscrossing each other in the outer frame; corners each defined by a common vertex of three abutting panels; and a one-piece molded corner connector having three engagement grooves into which the metal wires of the outer frames of the panels fit to form a corner of the cage.

The engagement groove of the corner connector may be defined by an outer wall and an inner wall formed with a width equal to or slightly smaller than the diameter of the metal wire forming the panel.

The lower ends of the four wire netting panels may be engaged in the engagement grooves of a one-piece molded synthetic resin rectangular tray.

The engagement groove of the tray may comprise a peripheral projection integrally formed with the bottom plate of the tray, and an inner projection formed with a width equal to the diameter of a metal wire of the wire panel having an optional downward taper.

There may be provided a one-piece molded synthetic resin edge connector which has an engagement groove in which the metal wire fits for connection.

At the upper and lower ends of the engagement groove of the edge connector, there may be formed an inward extension having a space tapered inward to be a width smaller than the diameter of the metal wire leading to a circular cross-section recess that has a diameter substantially equal to the diameter of the wire.

The edge connector may have a flexible groove for facilitating elastic deformation between two engagement grooves. The flexible groove may have an inner extension. The front panel has an opening on which a locking door is mounted.

According to the present invention, the corner formed by the top panel with two abutting side panels intersecting at right angles is simply and reliably connected by the synthetic resin corner connector to assemble a box. The box-like wire panel structure is easily mounted to the bottom tray. Further, the box-like wire panel structure is easily reinforced by the edge connectors.

The present invention has advantages as follows:

a) Various types of pet cages having different sizes can be assembled by one or two of the synthetic resin connectors.

b) Assembly may take place in retail shops, thereby providing easy shipment to those retail shops by saving storage space. With mass production of the cage, there is great cost savings.

c) The cage may be easily disassembled, which is convenient for cleaning.

d) Wire panels are used in the flat surfaces, thereby increasing transparency and decreasing the presence of the outline or silhouette, so that there is not an obtrusive feeling even when it is used indoors.

e) The corners of the cage are covered with synthetic resin corner connectors, thereby avoiding risk of damaging furniture and clothing.

f) Unfinished corners which typically appear complicated and unappealing are covered with the corner connectors, thereby providing a pleasing, box-like appearance.

g) The sharp corners which are typically a dangerous condition are covered with the synthetic resin corner connectors that have a soft feel. Accordingly, a user can handle the cage safely.

DETAILED DESCRIPTION OF THE PREFERRED EMBODIMENTS

Figure 1:
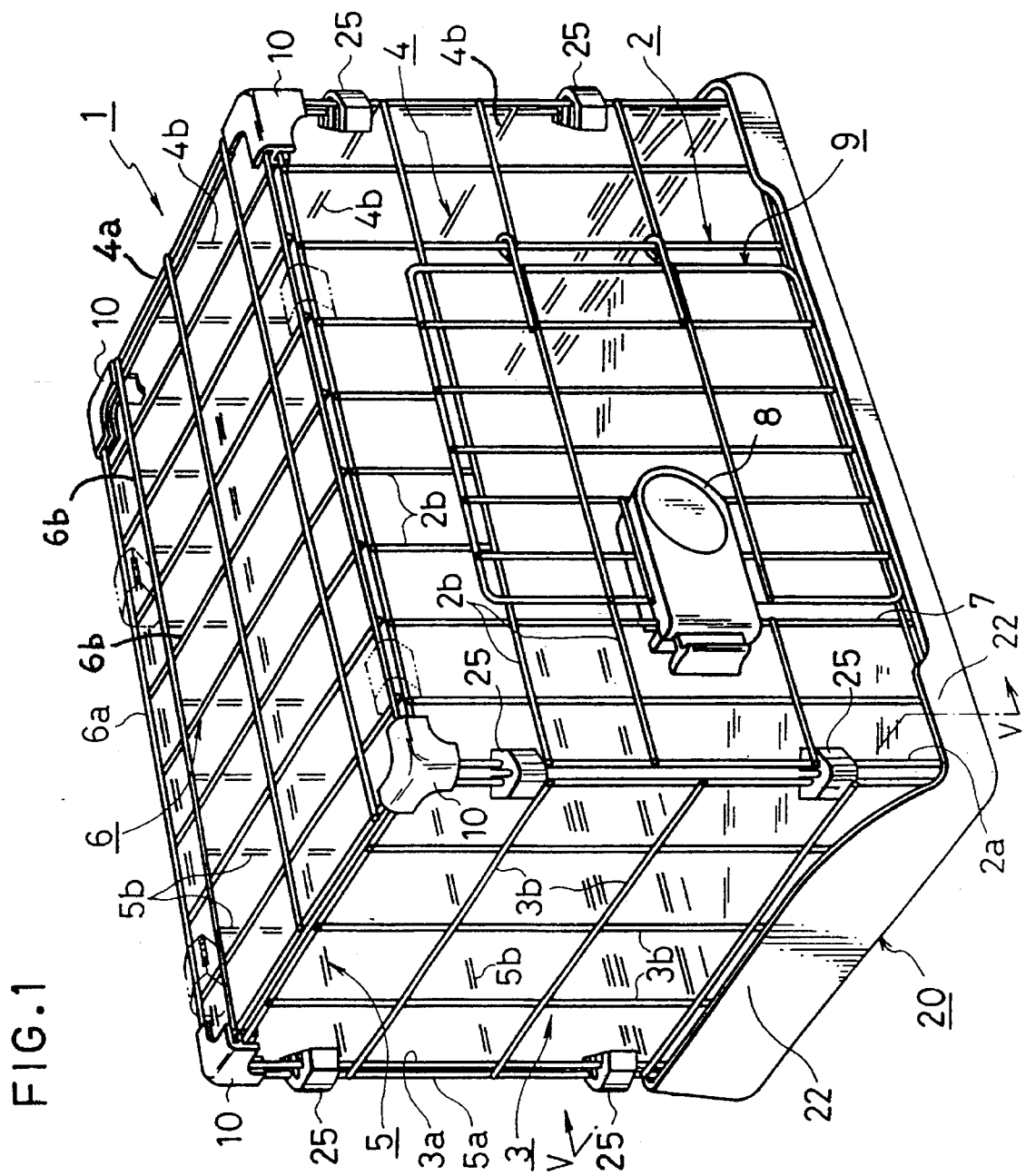
FIG. 1 is a perspective view of a pet cage according to the present invention.
Figure 2:
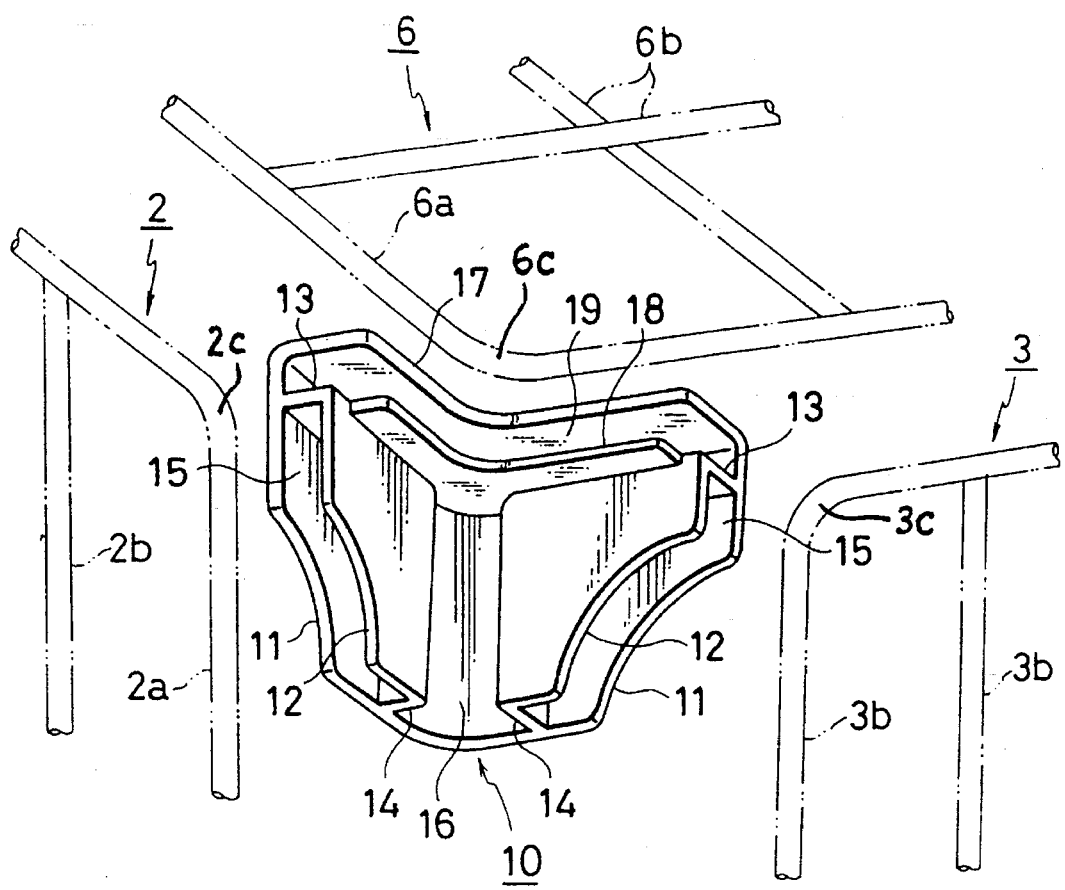
FIG. 2 is an enlarged perspective view of a corner connector in FIG. 1.
Figure 3:
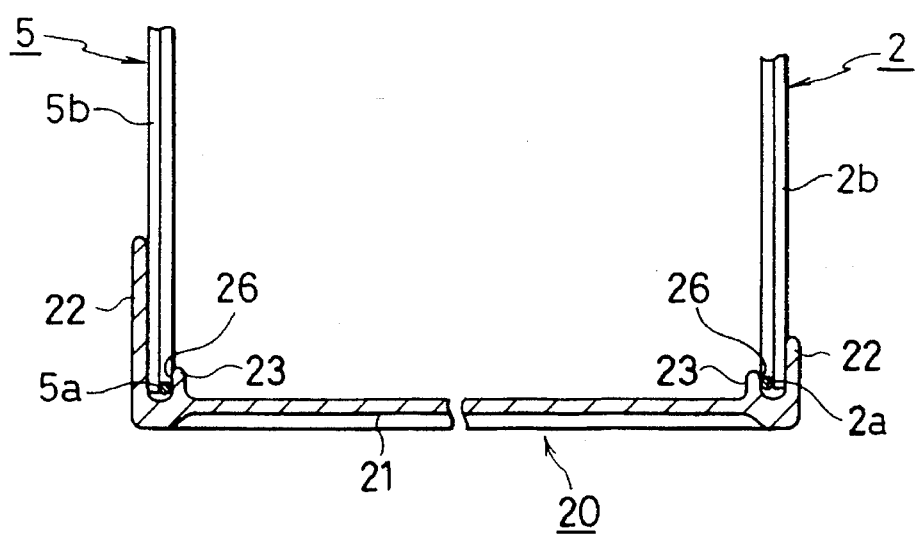
FIG. 3 is a longitudinal sectional view taken along the line V—V in FIG. 1.

FIGS. 1 to 5 illustrate preferred embodiments of the present invention. In FIG. 1, a pet cage 1 comprises front, left side, right side, and rear wire panels 2, 3, 4 and 5 and a top wire panel 6. Each of the panels 2 to 6 comprises rectangular outer frames 2a and 6a which are made of thick steel wires. In the outer frames 2a to 6a, same thickness steel wires are arranged vertically and horizontally, shown in FIG. 1 as bars 2b to 6b. The crossing points of intersections of the vertical and horizontal bars 2b to 6b and the outer frames 2a to 6a are welded. The four corners of each of the wire netting panels 2 to 6 comprise steel wires of the right-angled outer frames 2a to 6a that are rounded and there are no horizontal bars 2b to 6b extending around the corners as shown in FIG. 2.

There is an opening 7 through which an animal gets in and out of the cage 1 preferably at the lower middle portion of the front panel 2, having a door 9 with a locking device 8 that is pivotally attached over the opening 7.

To assemble the cage 1 in FIG. 1 from the panels 2 to 6, the wire panels 2 to 6 are connected by corner connectors 10 over four corners of the cube defined by the corners of the top panel 6. The corner connector 10 is formed as a one-piece molding of synthetic resin, and as shown in FIG. 2 in detail, inner walls 12 are formed so that the outer walls 11 are perpendicular to each other. The inner walls 12 are integrally formed with the outer walls 11 via an upper portion 13 and the inner vertical portion 14 so that the distance between the inner and outer walls 12 and 11 is equal to the diameter of the steel wire of the wire netting panels 2 to 6 or is slightly smaller than the diameter. Thus, an engagement groove 15 is formed between the inner and outer walls 12 and 11. A vertical groove 16 is formed between the vertical portions 14.

The upper end of the outer wall 11 over the upper portion 13 is connected with the top portion 17. The distance between the upper portion 13 and the top portion 17 is equal to or slightly smaller than the diameter of the steel wire. A flange 18 coplanar to the upper portion 13 is formed inside the upper portion 13. An engagement groove 19 is formed between the top and upper portions 17 and 13.

FIG. 2 is a perspective view in which the corner connector 10 in FIG. 1 is seen from the inside. Shown by dotted lines, corners 2c and 3c of the panels 2 and 3 and corner 6c of the top panel 6 are engaged in the grooves 15 and 19 as indicated by an arrow.

The lower edges of the four panels 2 to 5 are connected to a one-piece, molded, synthetic resin tray 20. The tray 20 comprises a peripheral projection 22 and an inner upward projection 23 on a bottom plate 21. The distance between the projections 22 and 23 is nearly equal to the diameter of the wire of the outer frames 2a and 5a of the panels 2 to 5 added to the diameter of the rods 2b to 5b, and the wall is inclined so that the distance may become narrower gradually such as in a taper. The upward projection 23 is formed over the whole periphery of the bottom plate 21, but is discontinued at four corners thereof. The lower edge of the side panels 2 to 5 are inserted in and connected with frictional engagement in the engagement groove 24 between the peripheral projection 22 and the upward projection 23.

Figure 4:
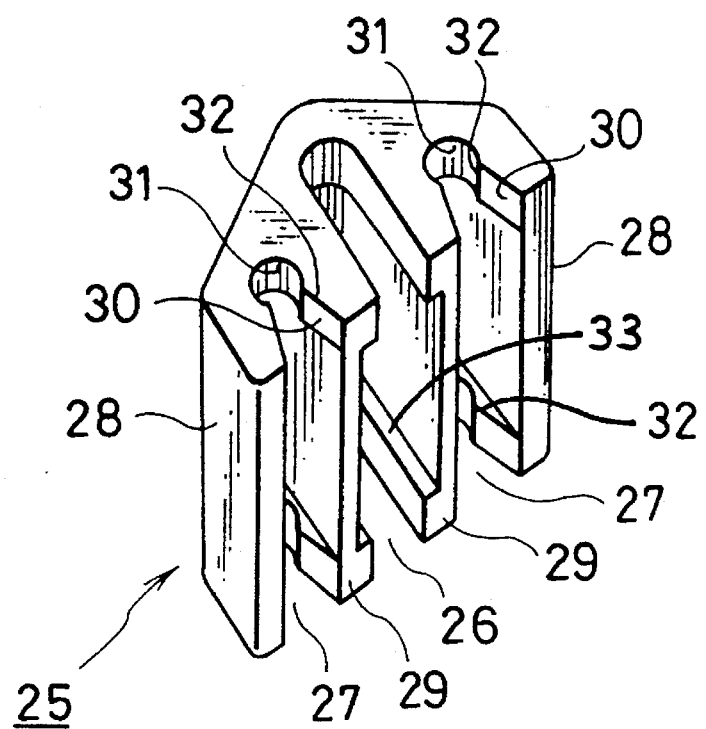
FIG. 4 is an enlarged perspective view of an edge connector in FIG. 1.
Figure 5:
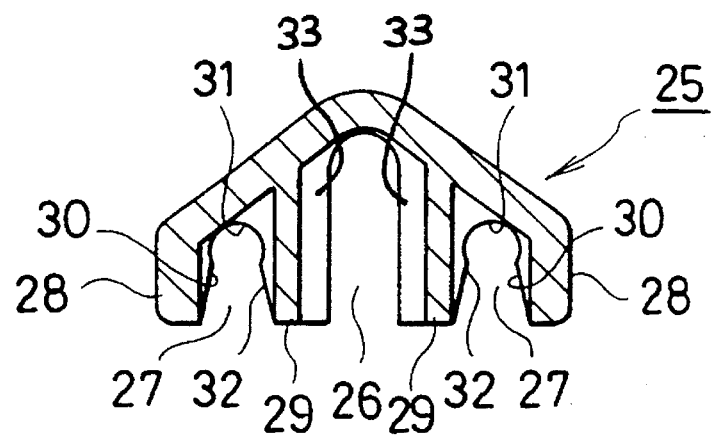
FIG. 5 is a central transverse sectional view of the edge connector in FIG. 4.

FIGS. 4 and 5 illustrate an edge connector 25 to further reinforce the cage 1 in which the panels are connected by the corner connectors 10. In the embodiment of FIG. 1, two of the edge connectors 25 are provided at the edge where the panels 2 to 5 abut each other in the cage 1.

The edge connector 25 comprises a one-piece, molded synthetic resin pentagonal column which has a vertical flexible groove 26 in the middle and vertical engagement grooves 27 at both ends. The engagement groove 27 and flexible groove 26 are defined by side walls 28 and inner walls 29. At the upper and lower ends of each of the engagement grooves 27 are inward extensions 32 each of which has a tapered guide portion 30 and a circular engagement portion 31, which is roughly equal to the diameter of the steel wire of the outer frames 2a to 6a of the panels 2 to 6. A flexible groove 26 is formed to facilitate elastic deformation, and extensions 33 are formed at the upper and lower ends, thereby increasing elasticity of the tapered guide portion 30 of the engagement groove 27. The two engagement grooves 27 of the edge connector 25 engage the outer frames 2a and 4a, 4a and 5a, 3a and 5a; and 2a and 3a of the panels 2 and 4, 4 and 5, 3 and 5; and 2 and 3 to connect adjacent portions, thereby strengthening the interconnection of the adjacent panels and increasing rigidity of the box.

The attachment of the top panel 6 to the cage is achieved, and is sufficiently strong to contain a pet, by use of the four corner connectors 10. If greater strength is required for the cage, and as shown in dotted lines in FIG. 1, optional edge connectors 25 may be mounted to the outer frame 6a of the top panel 6 and the upper outer frames 2a to 5a of the panels 2 to 5.

The foregoing relates to the preferred embodiments of the present invention, and various changes and modifications may be made by persons skilled in the art without departing from the scope of the claims. For example, instead of the bottom tray, a wire bottom panel similar to the top panel may be mounted to the bottom of the cage by corner connectors.

What is claimed is:

1. A pet cage comprising:
   at least five panels comprising one top panel and four side panels, each of which further comprises a metal wire outer frame, and vertical and horizonal metal wires that crisscross each other in the outer frame;
   corners each defined by a common vertex of three abutting panels; and
   a one-piece molded corner connector having three engagement grooves in which the metal wires of the outer frames of three of the panels fit to enclose the respective corner.

2. A pet cage as defined in claim 1 wherein two of the engagement grooves of the corner connector are formed between an outer wall and an inner wall which is spaced against the outer wall with a width which is substantially equal to a diameter of the metal wire, the metal wire of the outer frame of the side panels fitting in the engagement grooves and the other one of the engagement grooves is formed between a top portion and an upper portion with a width which is substantially equal to the diameter of the metal wire, the metal wire of the outer frame of the top panel fitting in the other one of the engagement grooves.

3. A pet cage as defined in claim 1 wherein the bottom portions of the side metal wire panels are engaged in grooves of a one-piece rectangular synthetic resin tray.

4. A pet cage as defined in claim 3 wherein the engagement groove of the tray is formed between a peripheral projection integrally formed with a bottom plate of the tray, and an upward projection inside the peripheral projection so that a width of the engagement groove may be substantially equal to a diameter of the metal wire.

5. A pet cage as defined in claim 4 wherein the cage further comprises a synthetic resin one-piece molded edge connector which has engagement grooves in which the metal wires of adjacent side edges of the wire panels fit.

6. A pet cage as defined in claim 5 wherein the edge connector further comprises inward extensions at the upper and lower ends of the edge connector, a width of each extension being formed narrower inwards, and slightly smaller than the diameter of the metal wire leading to a recess having a circular cross-section that is substantially equal to the diameter of the wire.

* * * * *